2 Sheets--Sheet 1.
C. T. CORNING & J. M. CURTIS.
Harvesters.
No. 153,050. Patented July 14, 1874.
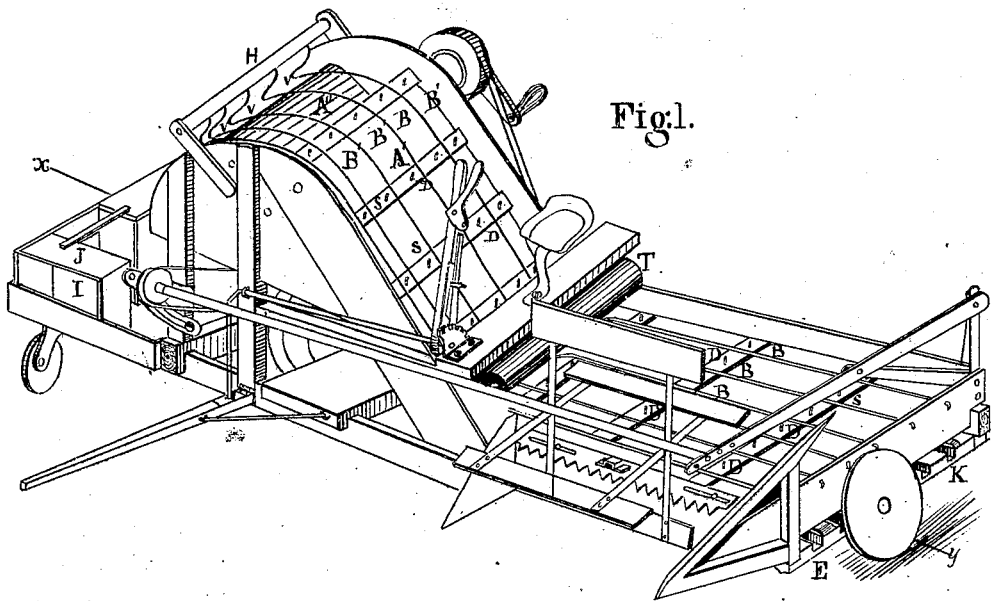
Fig. 1.
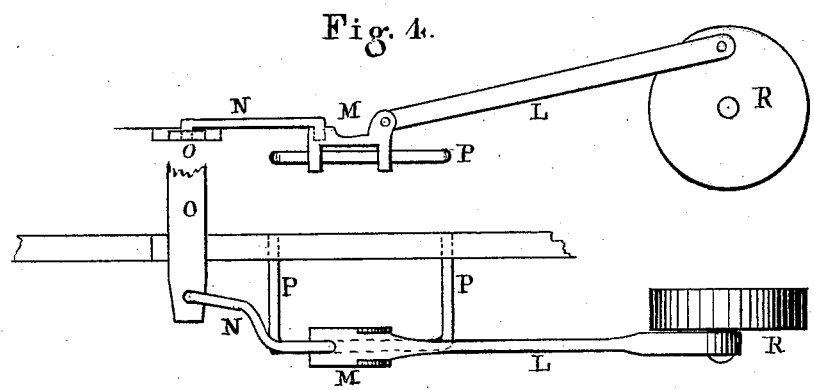
Fig. 4.
Fig. 5.
Attest  
Will L. Moton  
T. C. Smith
Inventor  
Charles T. Corning  
James M. Curtis  
Per A. H. & R. H. Evans  
Attys.

2 Sheets--Sheet 2.
C. T. CORNING & J. M. CURTIS.
Harvesters.
No. 153,050. Patented July 14, 1874.
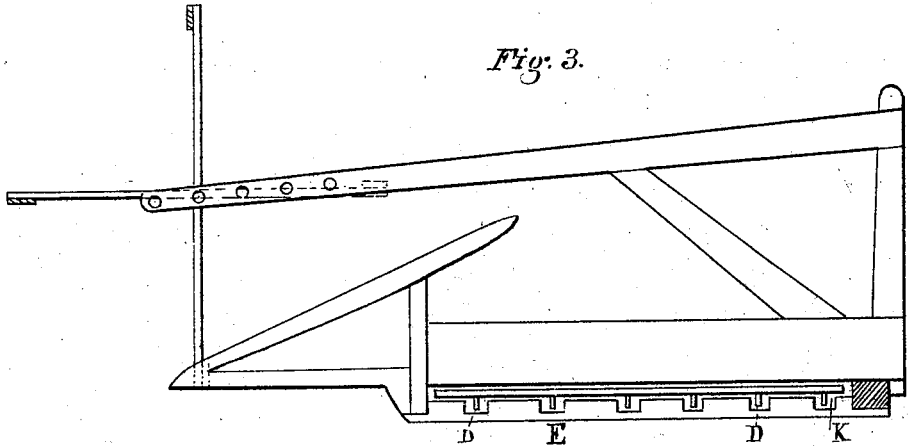
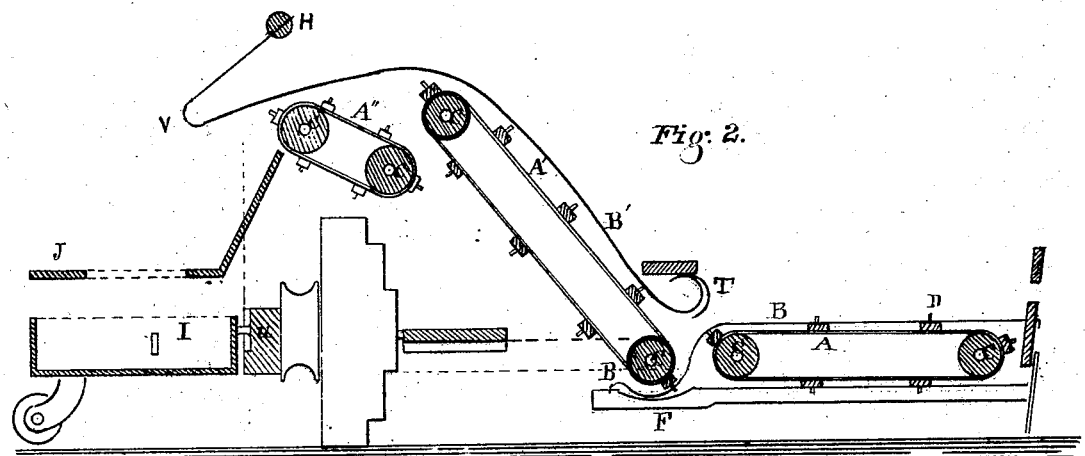
Attest
Will H. Moxon
T. C. Smith
Inventor
Charles T. Corning
James M. Curtis
per atty
A H & R K Evans

UNITED STATES PATENT OFFICE.

CHARLES T. CORNING AND JAMES M. CURTIS, OF ST. PAUL, MINNESOTA.

IMPROVEMENT IN HARVESTERS.

Specification forming part of Letters Patent No. 153,050, dated July 14, 1874; application filed February 28, 1874.

*To all whom it may concern:*

Be it known that we, CHARLES T. CORNING and JAMES M. CURTIS, both residents of the city of St. Paul, county of Ramsey and State of Minnesota, have made certain new and useful Inventions in Harvesting-Machines; and we do hereby declare the following to be a full, clear, and exact description of the same.

Figure 1 is a perspective view of our improved machine. Fig. 2 is a center sectional view taken through the line $x\ y$, Fig. 1. Fig. 3 is an end view; Fig. 4, a side view of sickle mechanism, and Fig. 5 a top view of same.

The same letters of reference are used in the various drawings in the designation of identical parts.

Letter B, Fig. 3, is the bottom boarding of the harvester proper, letter K showing grooves running longitudinally of the same. These grooves are cut in the bottom boards to allow the passage of the projecting pins D of the cross-bars S, which are placed across the endless carrier A, without raising the sickle farther from the ground.

Letter F, Fig. 2, designates a curved depression at the inner end of the grooved floor E. This depression is to form a receiver for all grain that may be rattled off in its cutting, and also to allow the lower end of the elevator A' to project as far as possible below the carrier A. Letter B, Figs. 1 and 2, shows a series of wire guards extending longitudinally over the endless carrier A, extending under the lower end of the endless carrier A'. The wires B keep the straw from being carried to the under side of the carrier. The curved metal shield T, Fig. 1, is placed across and just above the lower end of the carrier A', and is to prevent the bunching, and facilitate the passage of the straw to the under side of the elastic wire guards B'.

Starting from the inner side of the curved metal shield T, following its inner curve, and extending upward and over the carriers A' A'', are a series of wires, whose elasticity, while following the free upward passage of the straw, keeps the same in place against the face of the carriers A' A''. The upper and outer curved projections of the wires V terminate at their extreme ends in the adjustable wire-clamp H, which, while holding them in their natural position, allows of an upward movement of the whole to facilitate the passage of any clumps of straw that may gather underneath them, while their overhanging ends V keep the straw from being thrown into the binders' car. The extra carrier A'' prevents any grain from falling to the ground, its continuous rotations carrying and depositing said grain and the straw into the binders' car I. The relative positions of the carriers A' A'' can be seen in Fig. 2. Letter I, Figs. 1 and 2, designates an independently-acting binders' car attached to the main machine by means of the ring-bolts U, Fig. 2. By this method the strain upon the horses' necks consequent upon uneven ground, where the old-style car is used, is done away with, as the weight of the binders and car bears centrally, instead of depending upon the tongue for its support, and also, as a consequence, lightens the draft considerably. Letter R, Fig. 4, shows a crank-head, to which the connecting-rod L is attached. Letter M is a draw-head, working upon the projecting bearing P, letter N being the connecting-rod between the draw-head M and the scythe-lever O. The object of this device is to produce a steady and reliable motion of the scythe-lever O.

Having thus described our invention, what we claim, and want to secure by Letters Patent, is—

The wire guard B', in combination with the shield T and adjustable clamp H, substantially as and for the purposes set forth.

CHAS. T. CORNING.
JAMES M. CURTIS.

Witnesses:
W. R. WILLARD,
A. M. CLOSE.